Dec. 26, 1967   A. R. LONG   3,359,803
TORQUE DIVIDER
Filed Oct. 12, 1965   3 Sheets-Sheet 1

INVENTOR
ARTHUR R. LONG

Wheeler, Wheeler & Wheeler
ATTORNEYS

Dec. 26, 1967 A. R. LONG 3,359,803
TORQUE DIVIDER
Filed Oct. 12, 1965 3 Sheets-Sheet 2
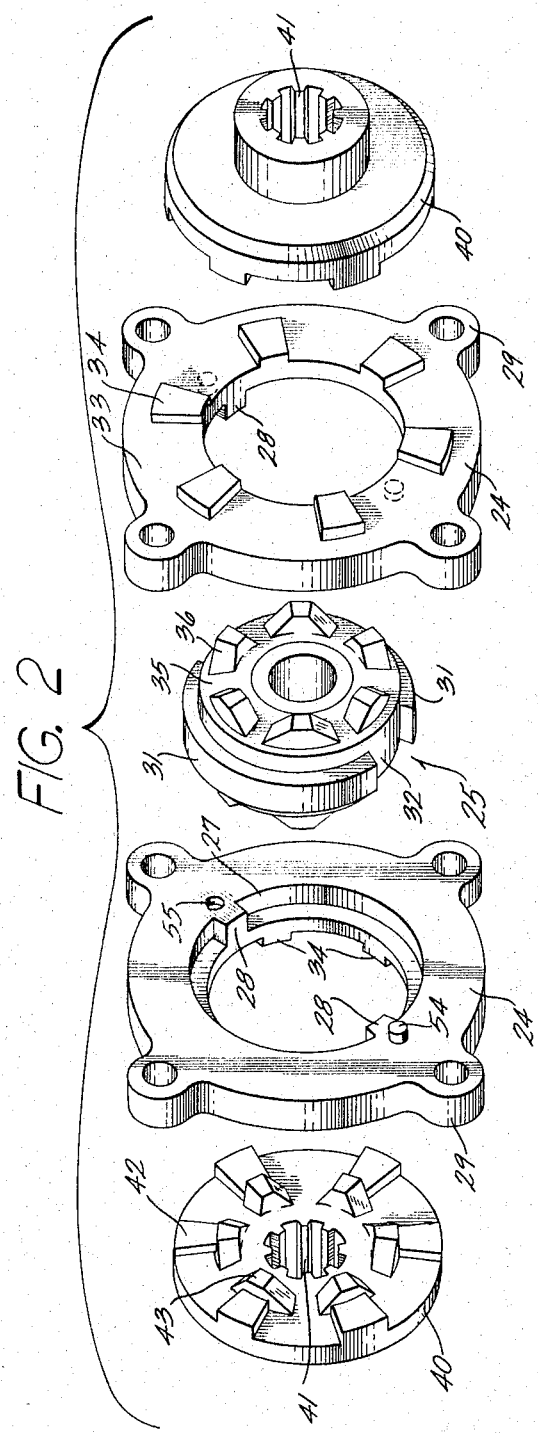
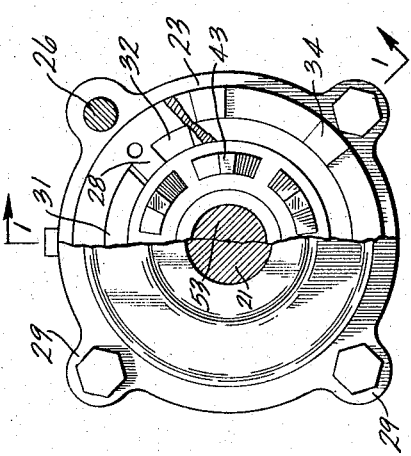
INVENTOR
ARTHUR R. LONG
Wheeler, Wheeler & Wheeler
ATTORNEYS

INVENTOR
ARTHUR R. LONG

United States Patent Office 3,359,803
Patented Dec. 26, 1967

3,359,803
TORQUE DIVIDER
Arthur R. Long, Kiel, Wis., assignor to Gilson Bros. Co.,
Plymouth, Wis., a corporation of Wisconsin
Filed Oct. 12, 1965, Ser. No. 495,211
8 Claims. (Cl. 74—650)

ABSTRACT OF THE DISCLOSURE

This disclosure relates to a torque divider having a driving cage with oppositely facing sets of driving jaw teeth and a center cam carrier with oppositely facing sets of cam teeth and differentially driven shafts having proximate inboard ends in bearing engagement in the center cam carrier, the shafts carrying in splined connection torque transmitting rotors each having respective sets of driven jaw teeth and cam follower teeth registering respectively with the driving jaw teeth on the cage and cam teeth on the cam carrier whereby to provide non-slip differential action between the driven wheels of a vehicle.

---

This invention relates to a torque divider which also provides non-slip differential action between the driven wheels of a vehicle.

This invention is an improvement on the torque dividing mechanism shown in United States Patent 2,329,075. Other versions of the mechanism of said patent are shown in United States Patents 2,385,864, 2,329,059, 2,329,058, 2,329,060, 2,638,794, 2,667,087 and 2,667,088.

An important feature of the present invention resides in the structure of the torque divider in which the center cam carrier functions as a bearing support for the proximate inboard ends of the differentially driven shafts. By reason of this construction there is no need to provide the driving axle of the vehicle with a center support bearing.

Another important feature of the invention resides in the aforesaid construction in which the center cam carrier also functions as a structural member to substantially isolate the oil filled chambers at both sides of the center cam carrier. These chambers contain the axially shiftable side gear and clutch rotors which move axially during the over-riding of one shaft with respect to the other. The peripheries of these rotors are closely spaced to the housing wall thereabout so that oil within each chamber must flow through this small space as the rotor moves axially in the course of over-riding. This provides a hydraulic head which damps the movement of the rotors, to minimize the impact of the gear teeth and deaden clash which would otherwise occur as the jaw and cam teeth move into and out of engagement during over-running movements of the rotor.

Other objects, features and advantages of the invention will appear from the following disclosure in which:

FIG. 2 is an exploded view of some of the parts of the torque divider of the present invention.

FIG. 3 is an end view of the torque divider, the housing being broken away to expose interior details.

Like parts are given the same reference characters in the several views.

Figure 1:
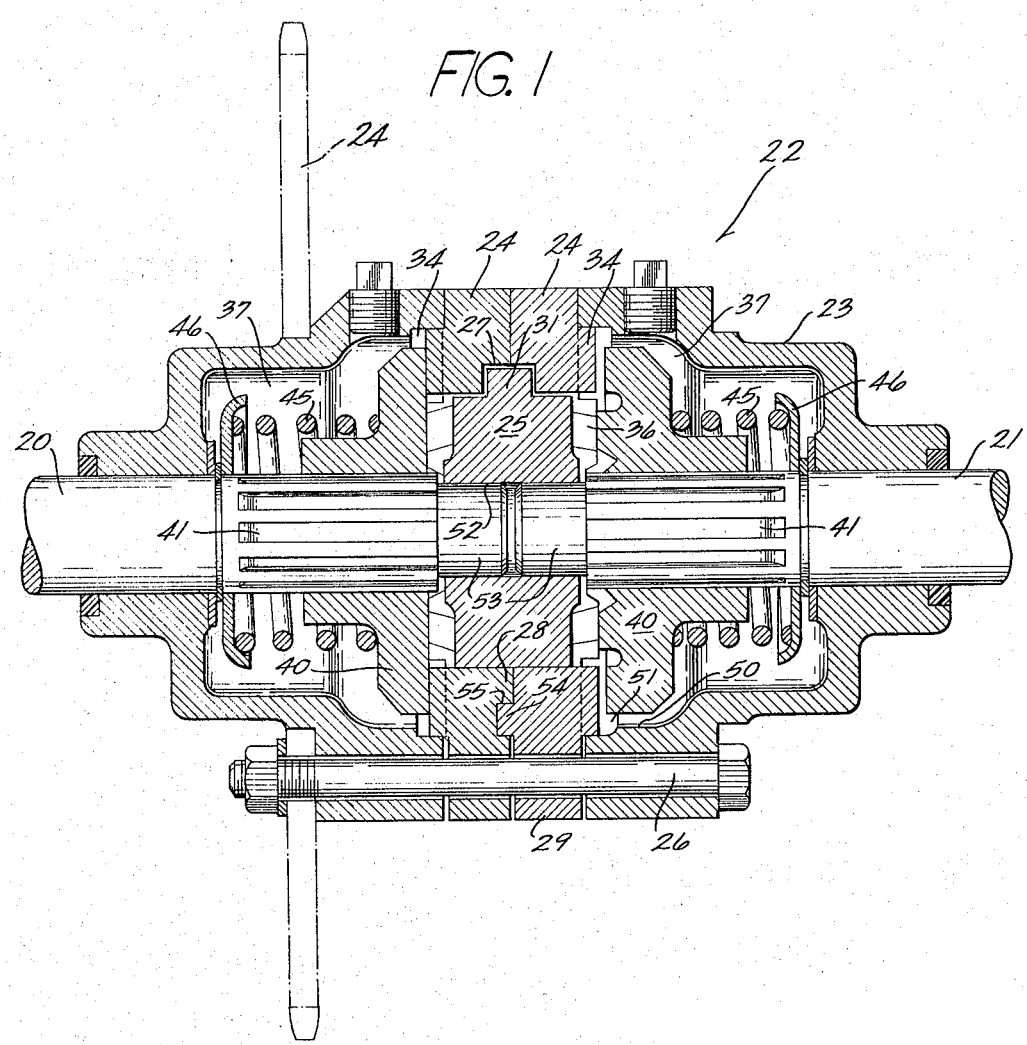
FIG. 1 is an axial cross section through a torque divider embodying the present invention, this view being taken along the line 1—1 of FIG. 3.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

The vehicle frame 10 (FIG. 4) has bearings 11, 12 for the differentially driven shafts 20, 21 respectively driving the wheels 13, 14. The torque divider 22 is supported entirely by the shafts 20, 21 from bearings 11, 12. By reason of the internal structure of the torque divider, there need be no other center bearing for the shafts 20, 21.

Figure 4:
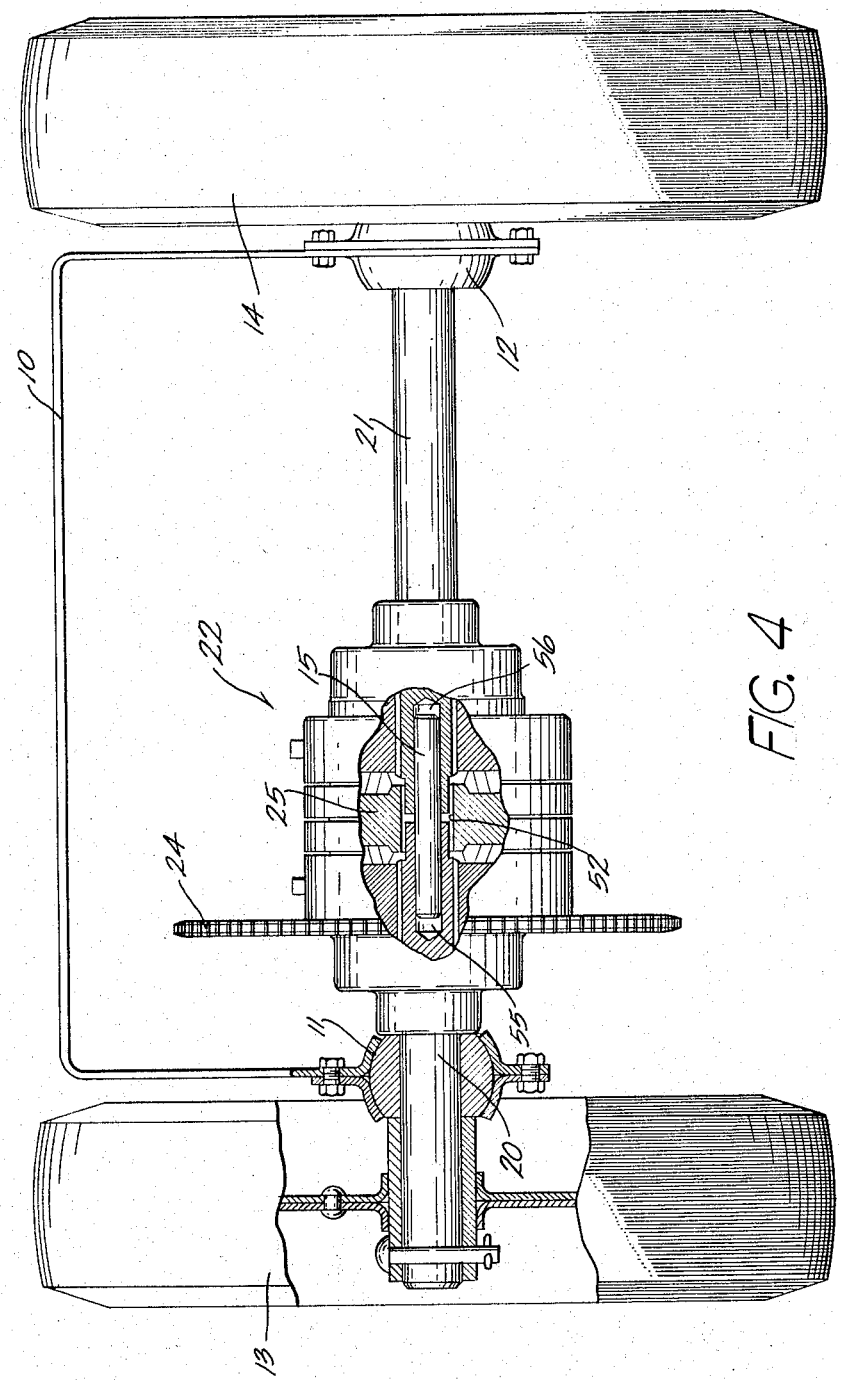
FIG. 4 is a fragmentary assembly view showing the torque divider mounted on a vehicle.

Two embodiments of the torque divider 22 are illustrated. In the embodiment of FIGS. 1–3 the inboard ends of shafts 20, 21 are solid. In the embodiment of FIG. 4 the inboard ends of shafts 20, 21 are provided with aligned bores to receive bearing pin 15. The embodiment of FIGS. 1–3 will be described first.

The differentially driven shafts 20, 21 have their inboard ends within the torque divider 22. The torque divider has a housing 23 to which driving sprocket 24 is connected. The housing 23 is desirably made in two mating halves which are clamped against the intervening pair of toothed driving rings 24 which also constitute a driving cage for the center cam carrier 25. The parts aforesaid are clamped together and mechanically interlocked by the lag bolts 26 which pass through eyes 29 on the rings 24 and registering eyes on the housing half sections 23.

The cage rings 24 each have facing annular grooves 27 interrupted only by the keys 28 which interlock the cage rings 24 with the center cam carrier 25. The center cam carrier 25 has two annular ribs 31 confined in the mating grooves 27 and interrupted circumferentially by socket gaps 32 into which the keys 28 on the cage ring 24 fit. Gaps 32 have a greater circumferential extent than keys 28. Accordingly, there is a lost motion driving connection from the cage rings 24 to the center cam carrier 25.

The opposite outwardly presented faces 33 of the cage rings 24 are provided with torque transmitting jaw teeth 34 with square flanks. The opposite outwardly presented faces 35 of the cam carrier 25 are provided with axially projecting cam teeth 36 with tapered flanks.

The housing halves 23 provide two chambers 37, one at each side of the center cam carrier 25. Within each chamber 37 there is a torque transmitting rotor 40 which functions as a combination driving and clutch side gear. The respective rotors 40 are slideably attached to the differentially driven shafts 20, 21, on splines 41.

Each side gear rotor 40 is provided with two sets of teeth, concentrically arranged. An outer set of jaw teeth 42 (six for each rotor in the disclosed embodiment) is adapted to mesh with the corresponding set of jaw teeth 34 on the cage rings 24. An inner set of bevel cam follower teeth 43 (six for each rotor in the disclosed embodiment) are adapted to coact with a corresponding set of cam teeth 36 on the center cam carrier 25.

The respective side gear rotors 40 are biased under the pressure of springs 45 toward engagement of both sets of teeth 42, 43 on the side gear rotors with the corresponding sets of teeth 34 on the drive rings 24 and teeth 36 on the center cam carrier. Springs 45 seat in the cups 46 respectively mounted on the shafts 20, 21 and rotate therewith.

When sprocket 24 is power driven from the vehicle engine and the wheels connected to the shafts 20, 21 follow a straight path without slipping, power is equally and uninterruptedly delivered to both shafts 20, 21 through the meshing jaw teeth 34, 42, respectively on the cage rings 24 and rotors 40. The entire torque divider 22 rotates as do all of the parts therewithin, without any relative motion therebetween.

When the vehicle turns a corner, one of the shafts 20, 21 will necessarily turn faster than the other. This produces relative rotation between one or both of the rotors 40 and the center cam carrier 25. This relative rotation will produce relative rotation between the respective cam and cam follower teeth 36, 43 on the relatively rotating cam carrier and rotor 40, thus to shift the rotor 40 axially on the splines 41, and unmesh the jaw teeth 34, 42 to declutch the shaft thereon from the torque divider. The axial extent of the cam and cam follower teeth 36, 43 is greater than the axial extent of the jaw teeth 34, 42. Accordingly, the jaw teeth 34, 42 are disengaged after partial axial movement of the rotor 40 has occurred.

The declutched rotor 40 will now over-run the cage 24. During over-running, the shaft 20 or 21 connected to the over-running rotor will be declutched from the power source without in any way effecting power transmission from the cage to the other rotor 40 and its shaft. When only one of the vehicle wheels is on ice or like slippery surface, it will not spin because the other wheel remains in full power transmitting connection to the engine through its engaged rotor 40. Accordingly, both wheels continue to drive, and neither will over-run.

The disclosed construction is such that over-running will occur for only a small portion of the relative rotation of the shaft on which the over-running rotor is mounted. As soon as the rotor 40 is fully cammed away from the center cam carrier 25, further relative rotation will put the cam and cam follower teeth 36, 43 on the downslope sides of the teeth and the spring 45 will restore the rotor axially to a position in which its jaw teeth 34 again mesh with the cage jaw teeth 42. If the over-running wheel continues to over-run, the cam and cam follower teeth 36, 43 will again interact to declutch the rotor 40 and cause another increment of rotative displacement between the rotor and the cage 24.

Under these circumstances, it is not unusual for the over-running rotor 40 to reciprocate rather rapidly on its splines 41 and the rotor will ratchet into and out of mesh with the drive cage 24. Unless damped, considerable impact or gear teeth clashing noises would result. In accordance with the present invention, clashing noises are damped or deadened so that they are reduced to an unobjectionable level, and the torque divider is relatively silent in operation.

Dampening of the noises is accomplished in the disclosed structure in which the diameter of the rotors 40 is just slightly less than the internal diameter of the cylindrical wall portion 50 of chamber 37. Accordingly, there is a small gap 51 between the rotor 40 and the wall 50. Chamber 37 is filled with oil for lubricating purposes. Axial reciprocation of the rotor 40 will pump the oil back and forth through the gap 51. The restricted cross section of the gap 51 will thus produce a throttling effect on oil flow, thus to hydraulically damp the movement of the rotor. Accordingly, impact shocks of the meshing teeth will be considerably reduced to deaden noises which would otherwise be produced thereby. By varying the clearance 51 and the viscosity of the oil, it is possible to vary the degree of hydraulic damping to suit various conditions.

In this connection, the center cam carrier 25 acts as a relatively oil tight physical partition between the respective chambers 37 in which the respective rotors 40 are housed. This preserves oil pressure at each side of the partition for effective damping purposes as aforestated.

An important feature of the invention resides in the structure of the center cam carrier 25 which has a relatively long axially elongated central bore 52 which provides a bearing surface on which the respective smooth walled end portions 53 of the shafts 20, 21 are journaled for rotation and support by the center cam carrier 25. These bearing surfaces are lubricated by the oil in chambers 37. When the rotors 40 over-run, their pumping action aforesaid provides forced lubrication to these and other bearing surfaces.

Accordingly, the cam carrier 25 also functions as a center bearing for the differentially driven shafts 20, 21. This construction eliminates the need for any external center bearing for the shafts 20, 21, these being supported on the vehicle solely on the end bearings 11 and 12.

The cage rings 24 are desirably provided with mating pegs 54 and sockets 55 to properly register the rings to align the keys 28 with each other and with the sockets 32 in the cam carrier 25. The two rings 24 are identical, simply being turned end for end and relatively rotated through 180° for assembly. This is an advantageous construction in that both rings 24 are cast in the same mold, thus reducing tooling costs.

While not essential, the rotors 40 and center cam carrier 25 are desirably fabricated of sintered iron. This increases the life of the gear parts and reduces maintenance and service requirements.

In the embodiment of FIG. 4, the inboard ends of the shafts 20, 21 have aligned bores 55, 56 to receive the bearing pin 15. Accordingly, in this embodiment pin 15 assists the bore 52 of center cam carrier 25 in providing a center bearing for the shafts 20, 21.

I claim:

1. In a torque divider having a driving cage with oppositely facing sets of driving jaw teeth, a center cam carrier with oppositely facing sets of cam teeth, a driving connection between the center cam carrier and the cage, differentially driven shafts having proximate inboard ends, respective torque transmitting rotors splined to the respective shafts and having respective sets of driven jaw teeth and cam follower teeth registering respectively with the driving jaw teeth on the cage and cam teeth on the cam carrier and springs biasing the rotors toward the cam carrier, the improvement which comprises said shafts having end bearing portions inwardly of the splines thereon and the center cam carrier having an axially elongated bore providing complementary bearings for said portions whereby the cam carrier comprises a center bearing member for the shafts.

2. The torque divider of claim 1 in which the cage comprises separately fabricated rings having facing grooves which form an annular channel, said cam carrier having a corresponding rib confined in said channel when said rings are held in face relationship, said rib having a socket and said grooves having a key in said socket and in lost motion engagement with said rib.

3. The torque divider of claim 1 in which said shafts have aligned bores, and a bearing pin therein.

4. In a torque divider having a driving cage with oppositely facing sets of driving jaw teeth, a center cam carrier with oppositely facing sets of cam teeth, a driving connection between the center cam carrier and the cage, differentially driven shafts having proximate inboard ends, respective torque transmitting rotors splined to the respective shafts and having respective sets of driven jaw teeth and cam follower teeth registering respectively with the driving jaw teeth on the cage and cam teeth on the cam carrier and springs biasing the rotors toward the cam carrier, the improvement which comprises said shafts having end bearing portions inwardly of the splines thereon and the center cam carrier having complementary bearings for said portions whereby the cam carrier comprises a center bearing for the shafts, and a housing about the cage which does not quite seal the space about both rotors, sufficient space being left between the rotors and the housing so that oil in said housing is pumped from one side of the rotor to the other through said space during over-running of the rotor to damp teeth clashing noises.

5. In a torque divider having a driving cage with oppositely facing sets of driving jaw teeth, a center cam carrier with oppositely facing sets of cam teeth, a driving connection between the center cam carrier and the cage, differentially driven shafts having proximate inboard ends, respective torque transmitting rotors splined to the respective shafts and having respective sets of driven jaw teeth and cam follower teeth registering respectively with the driving jaw teeth on the cage and cam teeth on the cam carrier and springs biasing the rotors toward the cam carrier, the improvement which comprises said shafts having end bearing portions inwardly of the splines thereon and the center cam carrier having complementary bearings for said portions whereby the cam carrier comprises a center bearing member for the shafts, and a housing about the cage and at both sides thereof to define separate oil chambers about the respective rotors, said center cam carrier constituting a structural partition substantially isolating said separate oil chambers.

6. In a torque divider having a driving cage with oppositely facing sets of driving jaw teeth, a center cam carrier with oppositely facing sets of cam teeth, a driving connection between the center cam carrier and the cage, differentially driven shafts having proximate inboard ends, respective torque transmitting rotors splined to the respective shafts and having respective sets of driven jaw teeth and cam follower teeth registering respectively with the driving jaw teeth on the cage and cam teeth on the cam carrier and springs biasing the rotors toward the cam carrier, the improvement which comprises said shafts having end bearing portions inwardly of the splines thereon and the center cam carrier having complementary bearings for said portions whereby the cam carrier comprises a center bearing member for the shafts, said cage comprising separately fabricated rings having facing grooves which form an annular channel, said cam carrier having a corresponding rib confined in said channel when said rings are held in face relationship, said rings having pegs and sockets for respectively mating when the rings are assembled in face relation.

7. The combination of a vehicle having driving wheels, drive shafts for said wheels, a torque divider intermediate said wheels and in driving connection to said shafts, said vehicle being provided with bearings upon which said shafts are supported near their ends, said torque divider comprising a housing having a rotary power input element by which the housing is rotated, a driving cage within the housing and having oppositely facing sets of driving jaw teeth, a center cam carrier with oppositely facing sets of cam teeth, a driving connection between the center cam carrier and the cage, said shafts having proximate inboard ends with bearing surfaces, said center cam carrier having an axially elongated bore providing complementary bearings for said surfaces whereby the cam carrier comprises a center bearing member for the shafts, respective torque transmitting rotors splined to the respective shafts and having respective sets of driven jaw teeth and cam follower teeth registering with the driving jaw teeth on the cage and the cam teeth on the cam carrier and springs biasing the rotors toward the cam carrier, the bearing relationship between the center cam carrier and the differentially driven shafts eliminating the need for any vehicle bearing to support the torque divider intermediate the vehicle bearings near the ends of the shaft.

8. The torque divider of claim 7 in which said shafts have aligned bores, and a bearing pin therein.

References Cited

UNITED STATES PATENTS

| 1,910,319 | 5/1933 | Brownlee | 74—650 |
| 2,037,305 | 4/1936 | Behrens. | |
| 2,638,794 | 5/1953 | Knoblock | 74—650 |
| 2,667,088 | 1/1954 | Myers | 74—650 |

FOREIGN PATENTS 536,461  12/1955  Italy.

A. HARRY LEVY, *Primary Examiner.*